E. C. BILLS, Jr.
Plow-Colter.

No. 15,919.

Patented Oct. 21, 1856.

UNITED STATES PATENT OFFICE.

EDMUND C. BILLS, JR., OF PERRY, NEW YORK.

APPARATUS FOR CLEANING COLTERS OR PLOWS.

Specification forming part of Letters Patent No. 15,919, dated October 21, 1856.

*To all whom it may concern:*

Be it known that I, EDMUND C. BILLS, Jr., of Perry, in the county of Wyoming and State of New York, have invented a new and useful Improvement in Apparatus for Cleaning Colters or Plows; and I do hereby declare that the following is a full, clear, and exact description of the construction and operation of the same, reference being had to the annexed drawings, forming part of this specification, in which—

Figure 2:
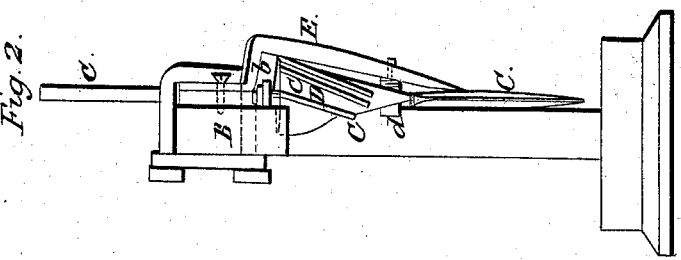
Figure 1:
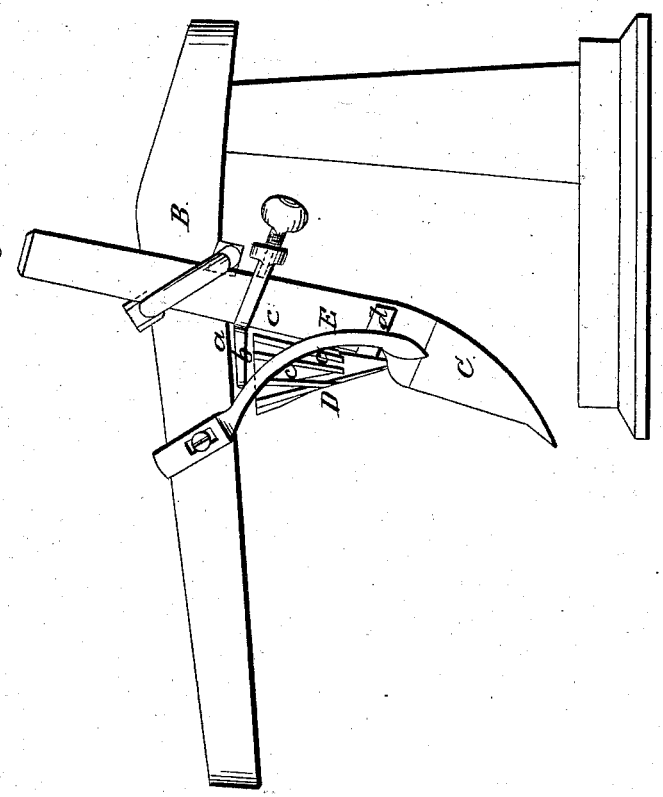

Figure 1 is a side elevation of colter with my apparatus attached. Fig. 2 is a front view of same.

Similar characters of reference in the several figures denote the same parts.

The object of my invention is to prevent the clogging of grass or rubbish upon the colters or cutting-edges of plows when breaking up ground.

The nature of the invention consists in suspending upon and in front of the colter, and above the cutting-edge of the same, an inverted ribbed cone, capable of rotation by the pressure of grass against it, so as to carry off said grass laterally and thus free the colter. The details of construction and operation are as follows:

In the drawings, B is the beam, and C the colter. Suspended upon the colter is the inverted cone D, its vertex resting in a small cavity in the upper edge of said colter, and its upper portion held by the adjustable support $a$, attached to colter, the small spindle $b$ on base of cone passing through a perforation in said support. This suspension permits the cone to rotate freely. Upon the surface of the cone are the curved ribs $c$, which by catching the grass pressing upon the cone produce the rotation of said cone.

E is a curved guard extending from beam to colter, and attached to the latter by the strap $d$ passing around it. The form and position of this guard are fully shown in the drawings.

The operation of the cone is as follows: The cone receives the grass. As the colter moves forward this grass rises upward upon said cone, and in so doing presses against the concave side of the ribs, and thus produces the rotation of said cone in direction of convexity of the ribs. This rotation of the cone carries off the grass laterally from the colter.

I expressly disclaim smooth cones and cylinders, and those that are ribbed in direction of their elements as colter-cleaners. I also disclaim the employment of mechanical devices for rotating such cleaners; but What I do claim, and desire to secure by Letters Patent, is—

The employment upon the front of the colter of an inverted cone having spiral flanges thereon, self-acting by the upward pressure of the grass to free the colter, substantially as set forth.

In testimony whereof I have hereunto signed my name before two subscribing witnesses.

E. C. BILLS, JR.

Witnesses:
 GEO. PATTEN,
 W. CROPFIELD.